(12) United States Patent
Galuten

(10) Patent No.: US 11,941,530 B2
(45) Date of Patent: Mar. 26, 2024

(54) CREATING DIVERSITY IN ARTIFICIAL INTELLIGENCE AND MACHINE LEARNING

(71) Applicant: Sony Interactive Entertainment LLC, San Mateo, CA (US)

(72) Inventor: Albhy Galuten, Santa Monica, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/796,840

(22) Filed: Feb. 20, 2020

(65) Prior Publication Data

US 2020/0265267 A1    Aug. 20, 2020

Related U.S. Application Data

(60) Provisional application No. 62/808,281, filed on Feb. 20, 2019.

(51) Int. Cl.
| | |
|---|---|
| *G06N 3/086* | (2023.01) |
| *G06F 18/214* | (2023.01) |
| *G06N 3/047* | (2023.01) |
| *G06N 20/00* | (2019.01) |

(52) U.S. Cl.
CPC ........... *G06N 3/086* (2013.01); *G06F 18/214* (2023.01); *G06N 3/047* (2023.01); *G06N 20/00* (2019.01)

(58) Field of Classification Search
CPC ........ G06N 20/00; G06N 3/08; G06N 3/0454; G06N 3/0445; G06N 7/005; G06N 20/10; G06N 20/20; G06N 3/126; G06N 3/0427; G06N 5/003; G06N 3/04; G06N 3/0472; G06N 3/086; G06N 5/02; G06N 5/04; G06K 9/6256; G06K 9/6257; G06K 9/6267; G06K 2009/4666; G06K 9/00664
USPC ......................................................... 382/159
See application file for complete search history.

(56) References Cited

U.S. PATENT DOCUMENTS

2016/0189301 A1 * 6/2016 Ng ...................... H04L 63/1433
705/36 R

* cited by examiner

*Primary Examiner* — Ajibola A Akinyemi
(74) *Attorney, Agent, or Firm* — Polsinelli LLP

(57) ABSTRACT

The present invention concern systems and methods for maintaining diversity in AI and ML environments through the cooperation of various AI and ML systems such that they optimize for social and cultural diversity. The examination of behavior, infrastructure, and governance, mimicking of genetic biodiversity, and application of the foregoing to machine reasoning mitigates the tendency of systems to find optimized or single best solutions. AI and ML environments may thus derive multiple diverse solutions that contribute to richer ecosystems in which human beings may function and thrive.

18 Claims, 11 Drawing Sheets

CREATING DIVERSITY IN ARTIFICIAL INTELLIGENCE AND MACHINE LEARNING

CROSS REFERENCE TO RELATED APPLICATIONS

The present application claims the priority benefit of U.S. provisional application No. 62/808,281 filed Feb. 20, 2019 the disclosure of which is incorporated herein by reference.

BACKGROUND OF THE INVENTION

Field of the Invention

The present invention generally relates to artificial intelligence (AI) and machine learning (ML). The present invention more specifically relates to maintaining diversity in AI and ML environments that mimic genetic biodiversity in order to mitigate the tendency of systems to seek a single best or optimal solution versus multiple diverse solutions indicative of human ecosystems.

Description of the Related Art

Biodiversity plays a role in maintaining healthy ecosystems. Healthy ecosystems in turn contribute to the maintenance of sustainable ecosystem services. Millions of biological systems and sub-systems exist on planet Earth. Many of those systems and sub-systems interact with one another in multiple and complex ways. Exemplary systems are involved in atmosphere regulation, freshwater production, soil formation, nutrient cycles, and regulation of climate. Planet Earth is the result of a four billion year process that required the contribution of a vast number of functions performed by an equally vast number of different life forms all ultimately driven by evolution. It is near certain that other planets in the universe with similar building blocks evolved differently with many (if not most) never reaching the present state of human self-awareness.

The people of Earth (humanity) are also socially diverse. Language, religion, customs, race, and ethnic identity are but a few touchstones that reflect such social diversity. Culture—the manifestations of collective human intellectual achievement—also impacts humanity. Culture shapes identity and influences behavior. Culture is reflective of a 'way of being' and can refer to shared language, beliefs, values, norms, behaviors, and material associations. Generations of individuals, families, and social collective pass culture from one generation to the next.

The richness of Earth correlates to its social and biodiversity. AI and ML environments nevertheless trend toward optimization and efficiency. A singular purpose or select set of goals is often reflective of this trend. AI and ML environment generally do not think holistically. Nor do they serve the needs of niche projects or social groupings. These environments do not tend to diversity.

A precondition of ongoing genetic evolution is ecologically relevant traits. Social evolution thus requires continued sociological diversity and maintenance. If society or global culture becomes too homogenous, it runs the risk of losing the social resilience necessary for a robust and adaptable society. There is thus a need in the art for environments where AI and ML systems can support and enhance a diverse social fabric and diverse multi-faceted technologies and systems.

SUMMARY OF THE PRESENTLY CLAIMED INVENTION

A first claimed embodiment of the present invention concerns a system for enhancing diversity through machine learning. The system includes storage that maintains information concerning behaviors, infrastructure, and governance. The system further includes a software engine maintained in a non-transitory storage medium and executable by a processing device to: gather training sets, analyze the information concerning behaviors, infrastructure, and governance in light of the training sets, and output policy suggestions that deviate from a single best solution in favor of multiple diverse solutions.

DETAILED DESCRIPTION OF THE INVENTION

Figure 1:
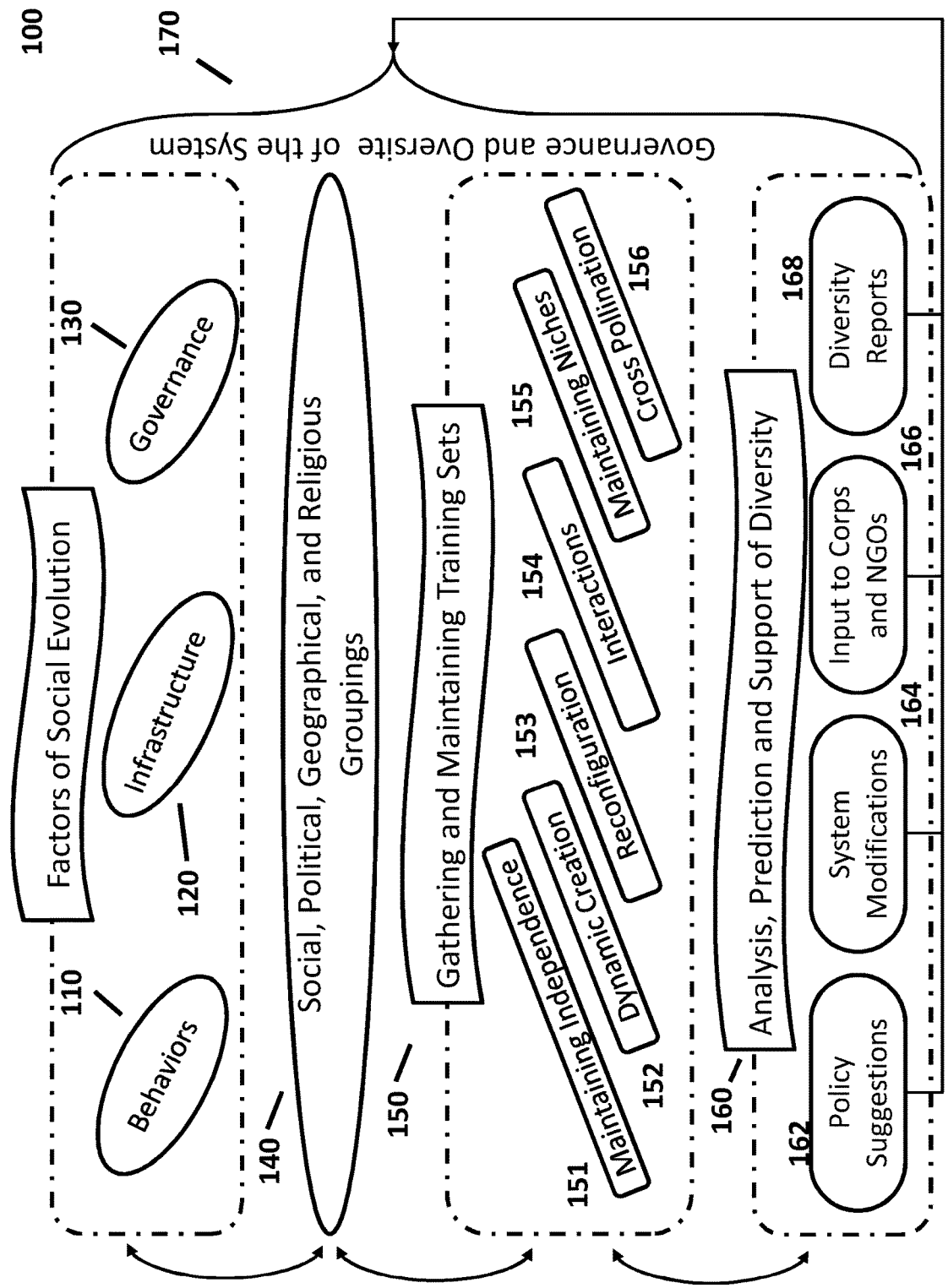
FIG. 1 illustrates the relationship between different social groupings and their behaviors, infrastructure, and governance.

Embodiments of the present invention concern systems and methods for maintaining diversity in AI and ML environments through the cooperation of various AI and ML systems such that they optimize for social and cultural diversity. The examination of behavior, infrastructure, and governance, mimicking of genetic biodiversity, and application of the foregoing to machine reasoning mitigates the tendency of systems to find optimized or single best solutions. AI and ML environments may thus derive multiple diverse solutions that contribute to richer ecosystems in which human beings may function and thrive.

Data representative of facets of social and physical diversity are injected into AI and ML environments. These facets of diversity are inclusive of mutations as well as historical social and cultural data. These facets of diversity cause AI and ML systems to develop richer and more robust mechanical and social environments. Such development affects not only the manner in which AI and ML systems interact with one another but also with human beings. For the purpose of the present disclosure, AI may be understood to include one or more of machine learning, deep neural networks, natural language process, expert systems, vision and speech processing and generation, planning, and robotics as well as combinations of the foregoing.

Embodiments of the present invention seek to address how to adapt AI systems to take into account the diversity of different elements of the foregoing social, infrastructure, and governance structures. Such adaptation would result in impact not limited solely to optimization but greater goals of personal, emotional, and social enhancement. The output of these adapted systems can be used to mitigate tendencies away from diversity and to devise suggestions for enhancing and ensuring the robustness of cultural and social diversity. The results can be applied in the context of social engagements such as gaming and media as well as with respect to policy and policy makers in an effort to influence, educate, and drive the same.

An exemplary AI system utilized in the context of the present invention may include any number of hardware and/or software components. The system may include data gathering, pre-processing, and handling implements for input data such as sensors (cameras, scanners, microphones, and facial recognition) or manual implements (keyboards, touch screens, gesture recognition, or mouse). Data and metadata gathered by these sensors may be representative of letters, words, Boolean values, or models that organizes elements of data into structure and standardizes how they relate to one another and properties of the real world. Data and models have non-generic features such as neural networks.

The AI system may include a training model that can utilize tagged input-output pairs or engage in unsupervised learning. Various weights may be used in the context of different variables that correlate to data and metadata. Output data processing and analysis may include classifications, recommendations, or likelihoods. Output data may be used to control a specific device such as a speech synthesizer, display, or other mechanisms that translate machine-readable information into human comprehensible data such as graphs, charts, and models.

The AI system may be implemented as part of a local network or in a cloud environment. Depending on the specific locale of the AI system implementation, any number of different integrated circuits, memory and storage units, network connections and interfaces, and databases may be utilized. A variety of CPUs, GPUs, and other processing units may operate in conjunction with any of the foregoing.

The present invention (operating in the context of an AI system) may consider social, governmental, and infrastructural evolutions or divergences such as the following. A culture such as the 4th Arrondissement or the Marais in Paris is a historically Jewish district. It is socially and sociologically different from the 8th Arrondissement, which is home to the Champs-Élysées, the Arc de Triomphe, the Place de la Concorde and the official residence of the President of France. Even further removed is the population around Château Rouge in the 18th Arrondissement who are mostly of African descent and are culturally distinct from the Champs, the Marais, or the Left Bank.

One might consider the Marais as a set of genetic mutations. It was originally an aristocratic section of Paris but at the end of the 19th century and by the first half of the 20th century it became home to a large influx of Ashkenazi Jews. The culture changed greatly as it also did during the occupation of France by Nazi Germany. These adaptations undoubtedly caused changes in social structure but also (albeit it to a lesser degree) in governance and infrastructure.

Other parts of the world have more differentiated infrastructure and governance approaches. A comparison of Riyadh, Saudi Arabia with Reykjavik, Iceland will find vastly different infrastructure needs (cold versus hot) not to mention governance (conservative versus liberal). Anthropological theory generally holds that the origin of all modern humans was in the Horn of Africa—Ethiopia, Djibouti, Eritrea, and Somalia). The state of the Horn of Africa versus other areas of the world clearly evidences that social evolution has been at least as strong a factor as has physical evolution.

FIG. 1 illustrates the relationship between different social groupings and their behaviors, infrastructure, and governance. These concepts are explored in further detail below with respect to FIG. 2. The factors of social evolution 100 illustrated in FIG. 1 evidences behaviors 110, infrastructure 120, and governance 130. Behaviors 110 generally include the ways in which people interact. This can include dating and carpooling as well as text messaging to shopping. Infrastructure 120 includes all things physical needed to make a society work such as food distribution, transportation, power grids, waste and water management as well as the Internet. Governance 130 is representative of rules and overarching behavioral expectations such as those created by governments, corporations and religions.

The foregoing elements of social structure can be further broken into social, political, geographical, and religious groupings 140. These groupings are multi-faceted and often overlapping in various respects. For example, an individual can be a French Catholic but live in a Hasidic Jewish Neighborhood in New York while being a politically active conservative.

The engine of the AI system is fed through the gathering and maintenance of training sets 150. The present invention does not seek to optimize based on a single best outcome to any question. Embodiments of the present inventions instead seek to generate nuanced and varied solutions to the same or similar questions in different social, physical, and political environments.

The gathering and maintenance of data in the context of the presently disclosed AI system includes maintaining the independence of training sets 151. Data gathering and maintenance may also involve dynamic creation of sets 152 as the groupings of social, physical, and political components are constantly changing. Training may involve dynamic reconfiguration of training sets 153. Because the training sets function within a world of other groups (physical, social, governance), the interactions 154 amongst training sets must always be taken into account.

Embodiments of the present invention seek to maintain diversity. There is a tendency for "good ideas" to become popular. For example, a longer lasting battery might be a good thing for most cultures to adopt. But other social norms such as the time and location of public transport may be better if kept diverse. It may therefore be important to maintain certain niche cultures and behaviors 155. And while maintaining and nourishing niches may in some instance be desirable, there may be equal value in stimulating their growth from select external inputs. Just as ecological diversity populated other lands, cross pollination 156 may be enabled in the context of training set gathering and maintenance.

Embodiments of the present invention next consider what is appropriate or fulfilling. This operation occurs in the context of analysis, prediction, and support 160. This operation may include making policy suggestions 162, modifying the system 164 to support independence, cross pollination, or niche maintenance. Various input mechanisms may be provided to channel information to corporations and NGOs 166 or generate reports on diversity 168.

Governance and oversight 170 decides what to affect and how. While perhaps politically difficult, the system may nevertheless serve as a facilitation tool. This tool may ultimately prove critically necessary if humanity is to survive as a species.

Figure 2:
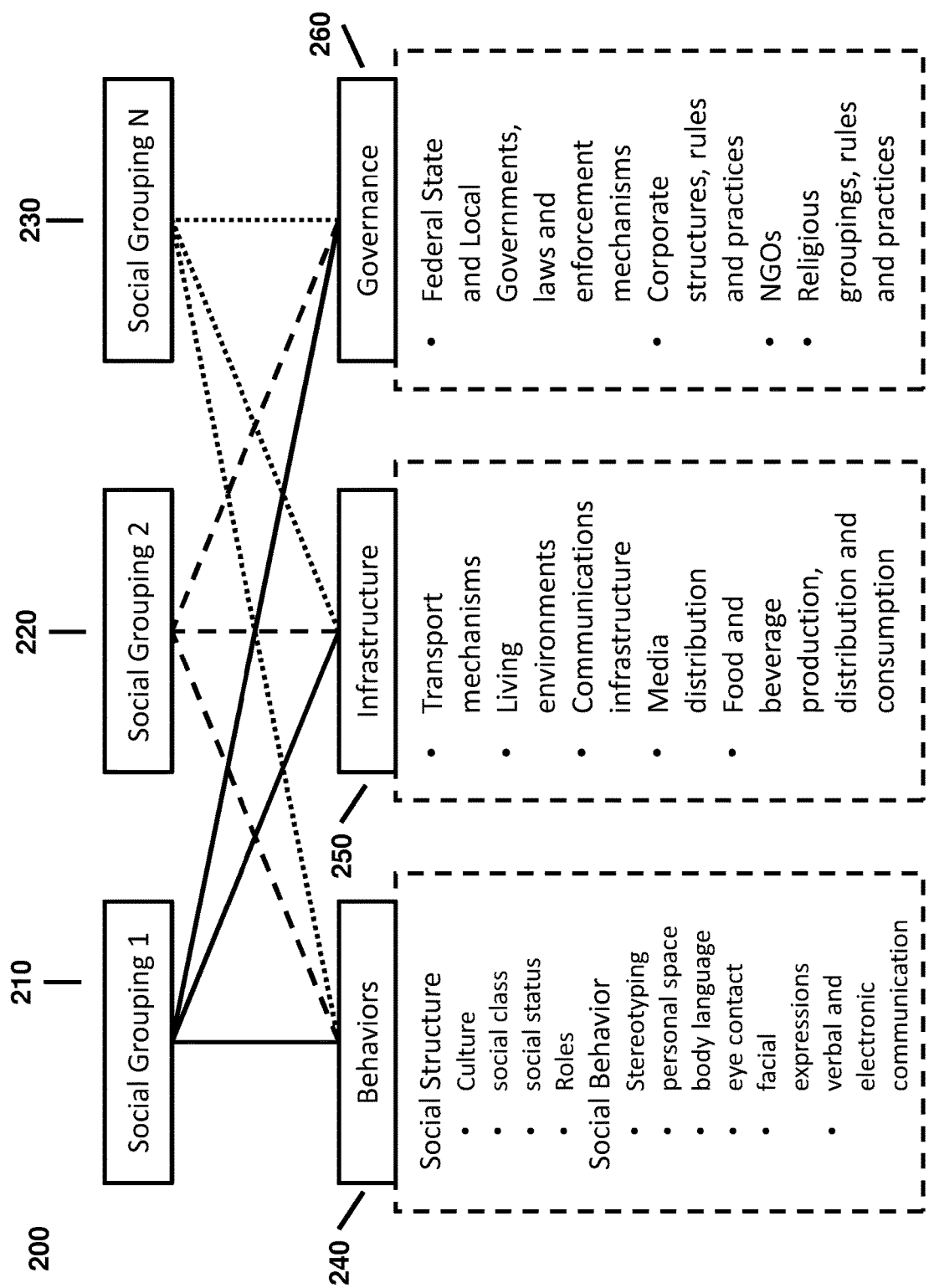
FIG. 2 illustrates the relationship between elements impacted by the social environment.

FIG. 2 illustrates the relationship 200 between elements impacted by the social environment. FIG. 2 shows the basic relationship among social groupings 210-230 and the domain components of social environments: behaviors 240, infrastructure 250, and governance 260.

Behaviors 240 are inclusive of social structure and social behavior. Social structure is generally representative of culture, social class, social status, and societal roles. Social behavior is representative of stereotyping, personal space, body language, eye contact and facial expressions, as well as verbal and electronic communication.

Infrastructure 250 is inclusive of physical infrastructure such as transport mechanisms, living environments, communications infrastructure, media distribution, governmental services such as police and fire, and supply chain management, including food and beverage production, distribution, and consumption.

Governance 260 includes all types of governance. This includes federal, state, and local government as well as laws, regulations, and enforcement mechanisms. Governance is similarly inclusive of corporate structure and religious groupings and the rules and practices of each.

Figure 3:
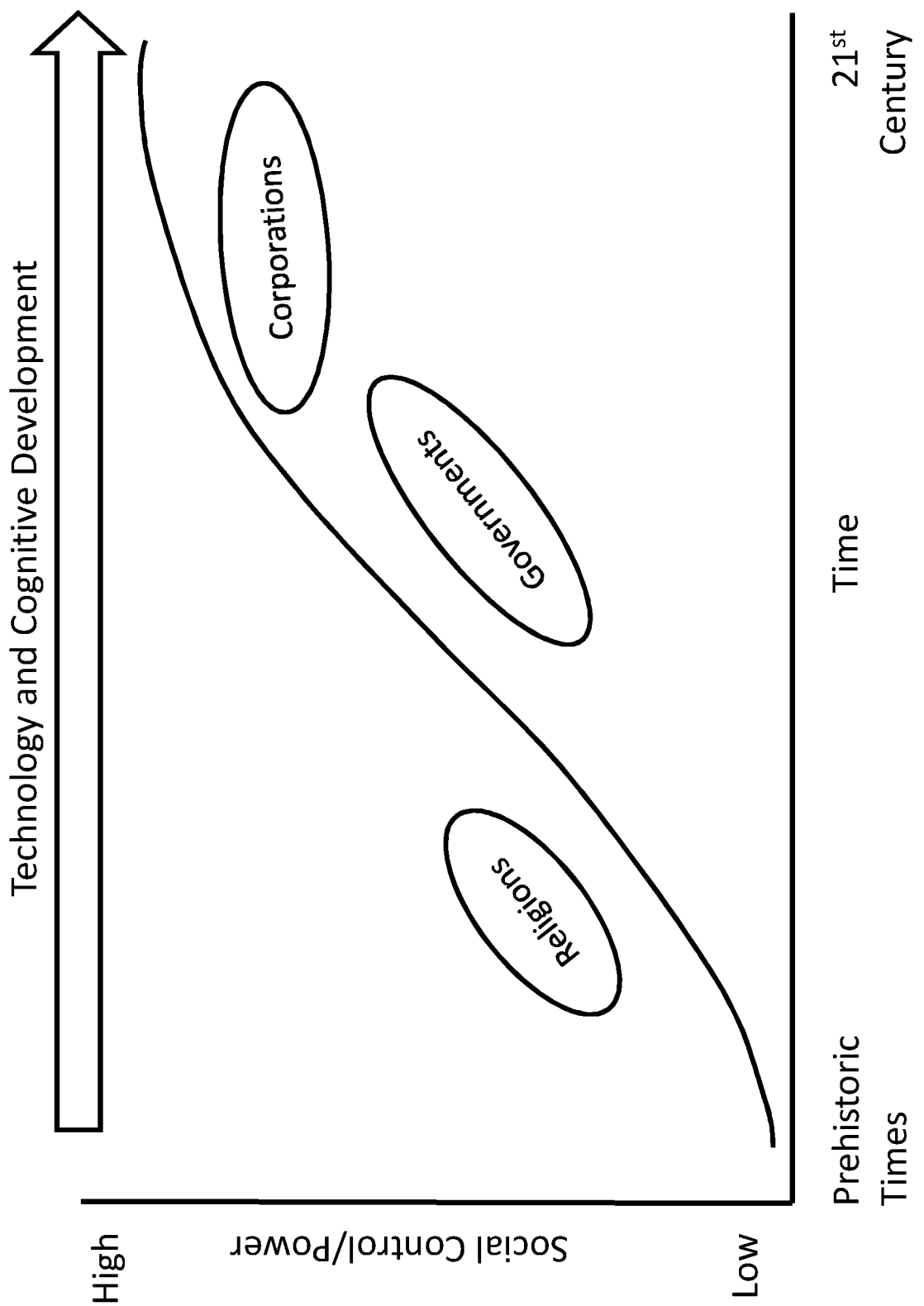
FIG. 3 illustrates the evolution of social diversity.

FIG. 3 illustrates the evolution of social diversity. FIG. 3 demonstrates the general progression of governance structures over evolutionary time frames. As technology has progressed from simple tools to robots and artificial intelligence, social structures and governance structures have also evolved. Early hominids had little understanding of cause and effect, existed in small social groupings, and were governed by a combination of power based on physical strength and religion (or superstition) and the practitioners thereof.

As humanity evolved, religions became more centralized and governments encompassed larger territories. Religions and governments often had a high degree of overlap. Gradually over the course of time, governments have come to exert more sway over social and infrastructural components than religions. Corporations have existed for centuries but are now becoming more powerful and more global (extra-territorial). As power is increasingly wielded through the use of data, opinion, and social manipulation, corporations are gaining power on par or in some instances in excess of governments.

Figure 4:
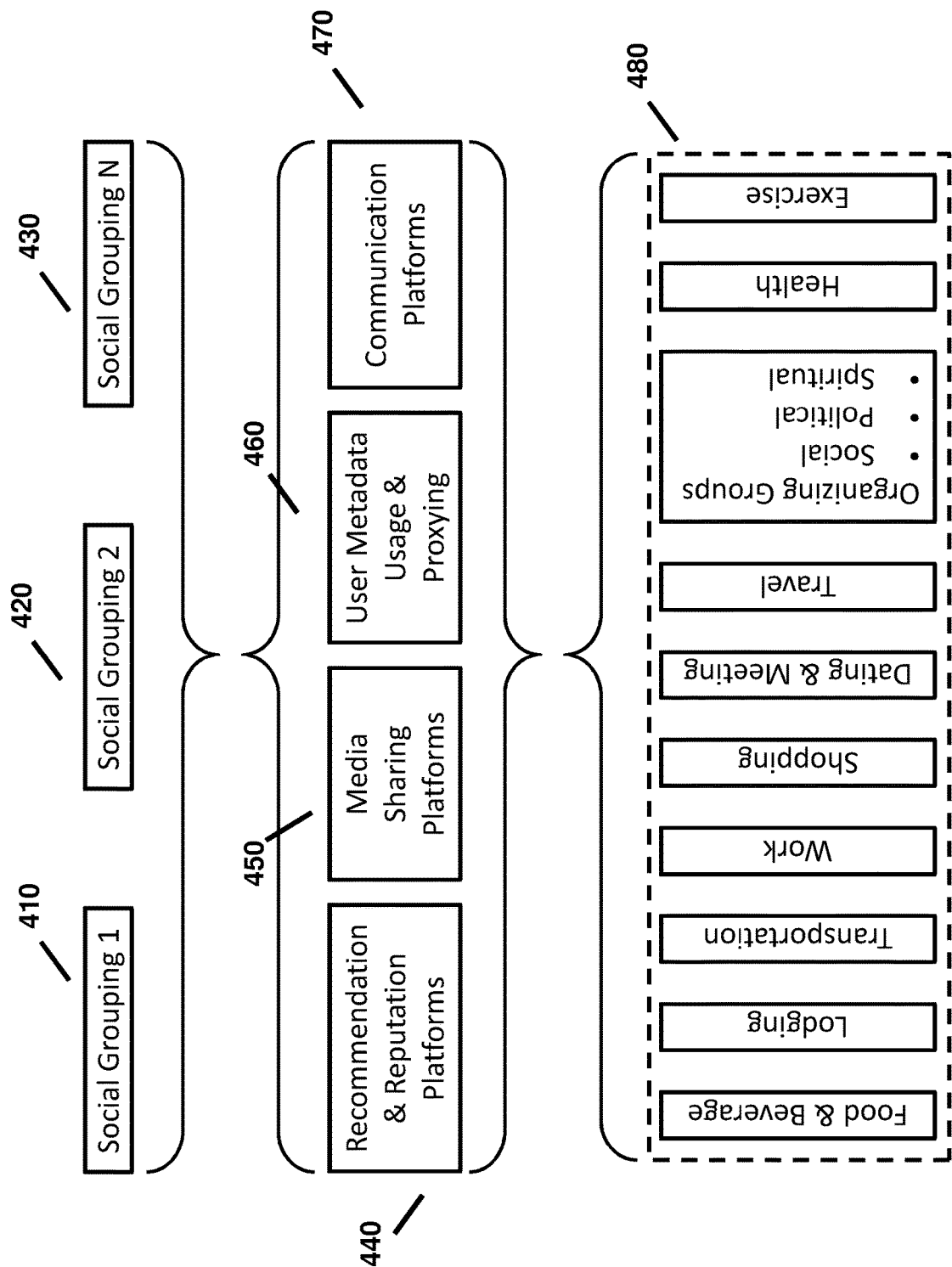
FIG. 4 illustrates platforms used in social environments and the functions they manage.

FIG. 4 illustrates platforms used in social environments and the functions they manage. FIG. 4 shows how we can break social infrastructure into a number of components. FIG. 4 is presented with an arbitrary number of social groupings (410, 420, 430). One might consider groupings 410-430 "subjects." The "verbs" to those subjects are the recommendation and reputation platform 440, media sharing platform 450, user metadata usage and proxying platform 460, and communications platform 470.

Examples platform 440 include LinkedIn, Yelp, and TripAdvisor but are noteworthy in that infrastructure players such as Uber and Airbnb may utilize the same. Examples of Media Sharing Platforms 450 include YouTube, Spotify, Netflix and Twitch. User Metadata and Proxying 460 are used by many platforms, the most apparent of which include Facebook, Google, WeChat, and Instagram. Like platform 440, metadata platform 460 may be used any number of participants in the environment. Communications platforms 470 are used by most everyone and include Facebook, Apple, AT&T, Instagram, Snapchat, and Verizon.

Continuing the grammatical analogy, the presently disclosed invention now considers the "objects" of the construction. The "objects" in our model are the things individuals or social groups try accomplish using these tools (verbs). Objects (480) include but are not limited to food and beverage, lodging, transportation, work, shopping, dating and interaction, travel, social groupings (inclusive of social, political, and spiritual), health, and exercise.

Figure 5:
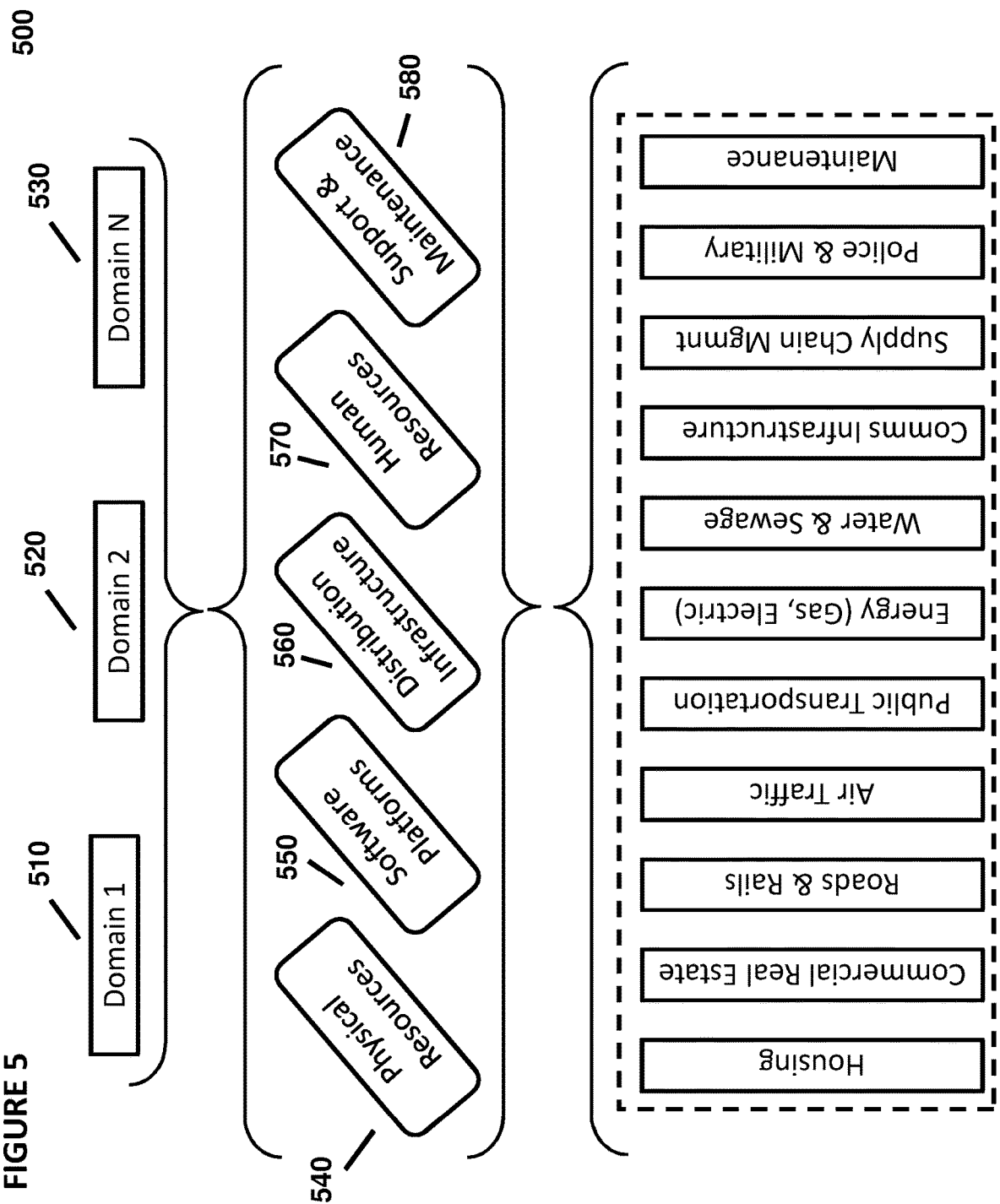
FIG. 5 illustrates the relationship between infrastructure elements.

FIG. 5 illustrates the relationship 500 between infrastructure elements. These are primarily physical, but can include support services and software. Looking at the Domains (510-530), they can be at the global level (air traffic control), at the national level (highway systems or electrical grid), at the state level, the city level or even at the neighborhood or building level. In order to instantiate infrastructure, we need human, physical and management (including software) elements.

These elements include but are not limited to physical resources 540, software platforms 550, distribution infrastructure 560, human resources 570, and support and Maintenance 580. Infrastructure must be built, supported, and maintained. Some examples of the things that must be built, supported, and maintained are Housing, Commercial Real Estate, Roads and Rails, Air Traffic Control, Public Transportation, Energy (Gas & Electric), Water and Sewage, Communications Infrastructure (wireless, wired), Supply Chain Management, Police and Military and the Support and Maintenance entities that support and maintain all of the above.

Figure 6:
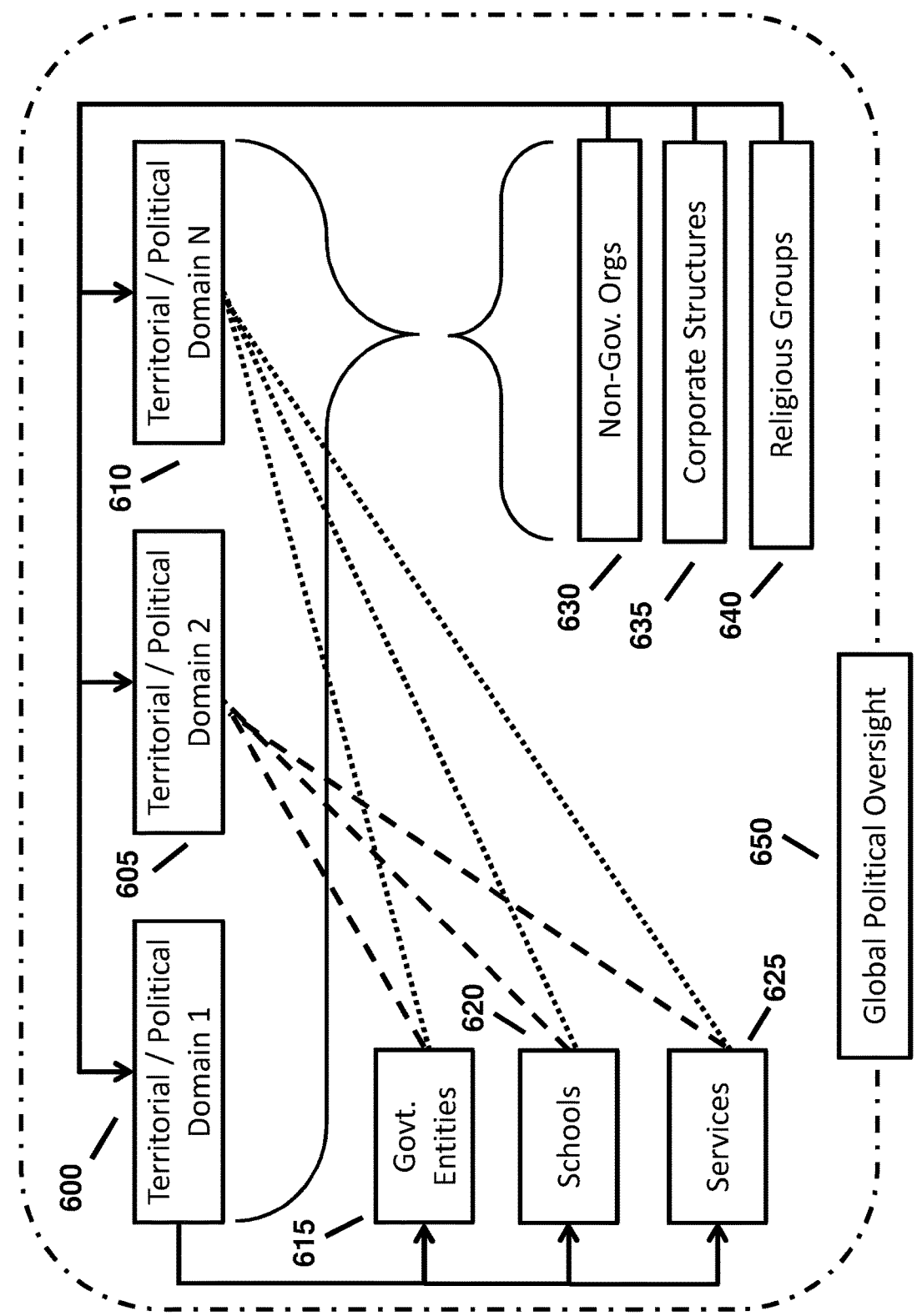
FIG. 6 illustrates the relationship between governance elements.

FIG. 6 illustrates the relationship between governance elements. Territorial/Political Domains (600, 605, 610) might be countries, states or cities but may also be physical territories with some number of governing bodies such as a city has a city council but is also in a state and a country. Government Entities (615) include things like legislatures, courts, trash removal, and military. While Schools (620) and Services (625) are separately, this separation is somewhat arbitrary as one can easily see dozens or hundreds of services based on the level of granularity applied.

Outside of governments there are governance entities such as NGOs 630 that typically operate independent of any government and often for the benefit of social or political issues. NGOs 630 are often cross-territorial. The next group of entities includes corporations 635. Wealthy individuals and corporate executives are rarely constrained by territorial borders and many corporations and executives have great power over and within governments. Of varying degrees of power are religious groups 640. In some countries religious groups 640 still wield excessive power but in others their power is waning. It still other countries, such groups have little to no power at all.

Because of constantly shifting power dynamics and the ability of software systems to manipulate social structures there is a need for global political oversight 650. The AI systems and mechanisms discussed herein are designed to provide just such an oversight function while simultaneously maintaining social and sociological diversity.

Figure 7:
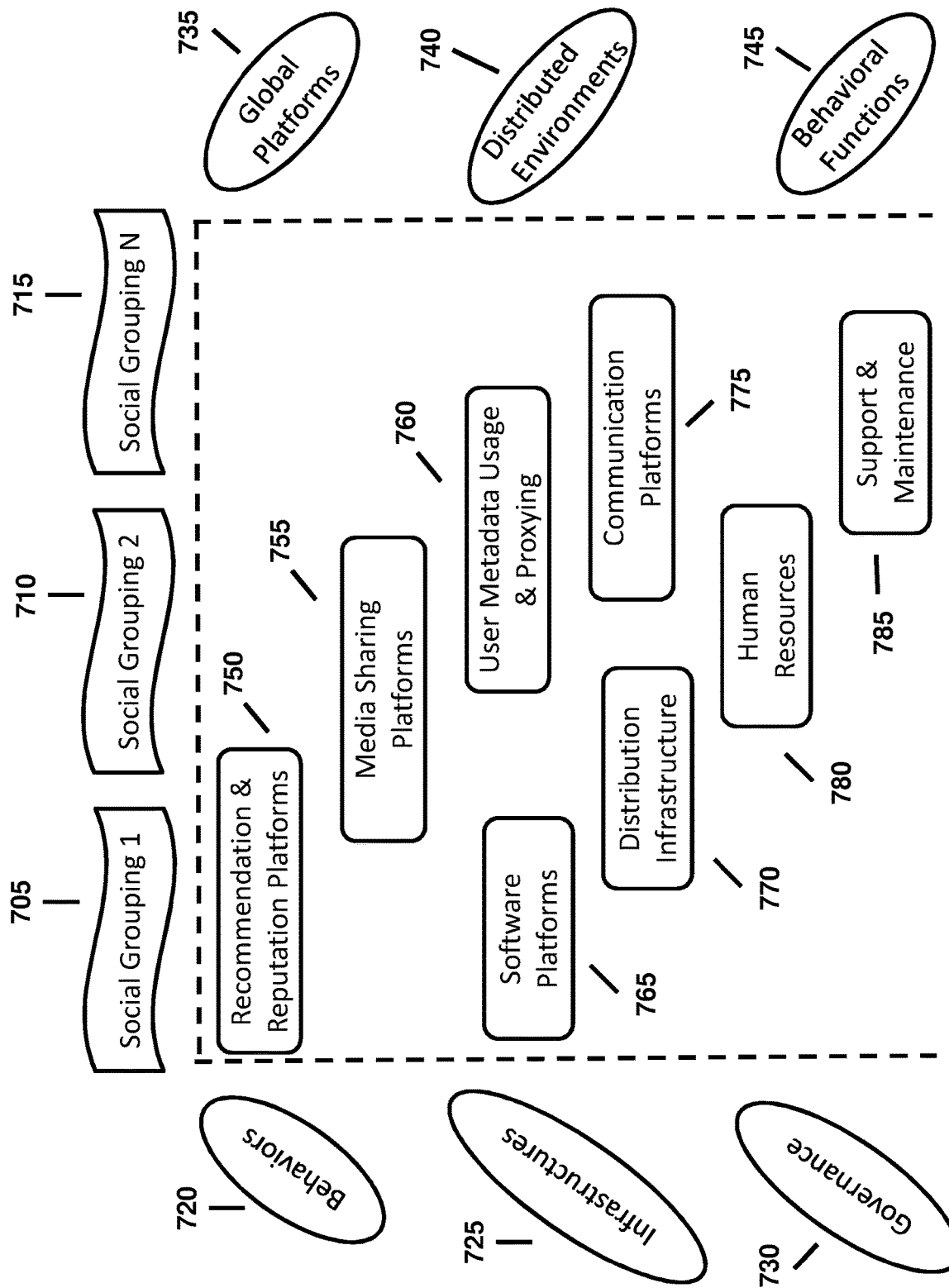
FIG. 7 illustrates the relationship between governance global platforms, distributed environments, and behavioral functions.

FIG. 7 illustrates the relationship between governance global platforms. FIG. 7 illustrates various Social Groupings (705, 710, 715). FIG. 7 also illustrates the three primary and previously discussed human and physical elements: behaviors 720, infrastructure 725, and governance 730. FIG. 7 also shows the modern instantiation of these elements as software and networked equivalents: global platforms 735, distributed environments 740, and behavioral functions 745. Elements 735-745 act on the Social Groupings 705-715 using Recommendation & Reputation Platforms (750), Media Sharing Platforms (755), User Metadata Usage & Proxying (760), Software Platforms (765), Distribution Infrastructure (770), Communication Platforms (775), Human Resources (780) and Support & Maintenance (785).

Figure 8:
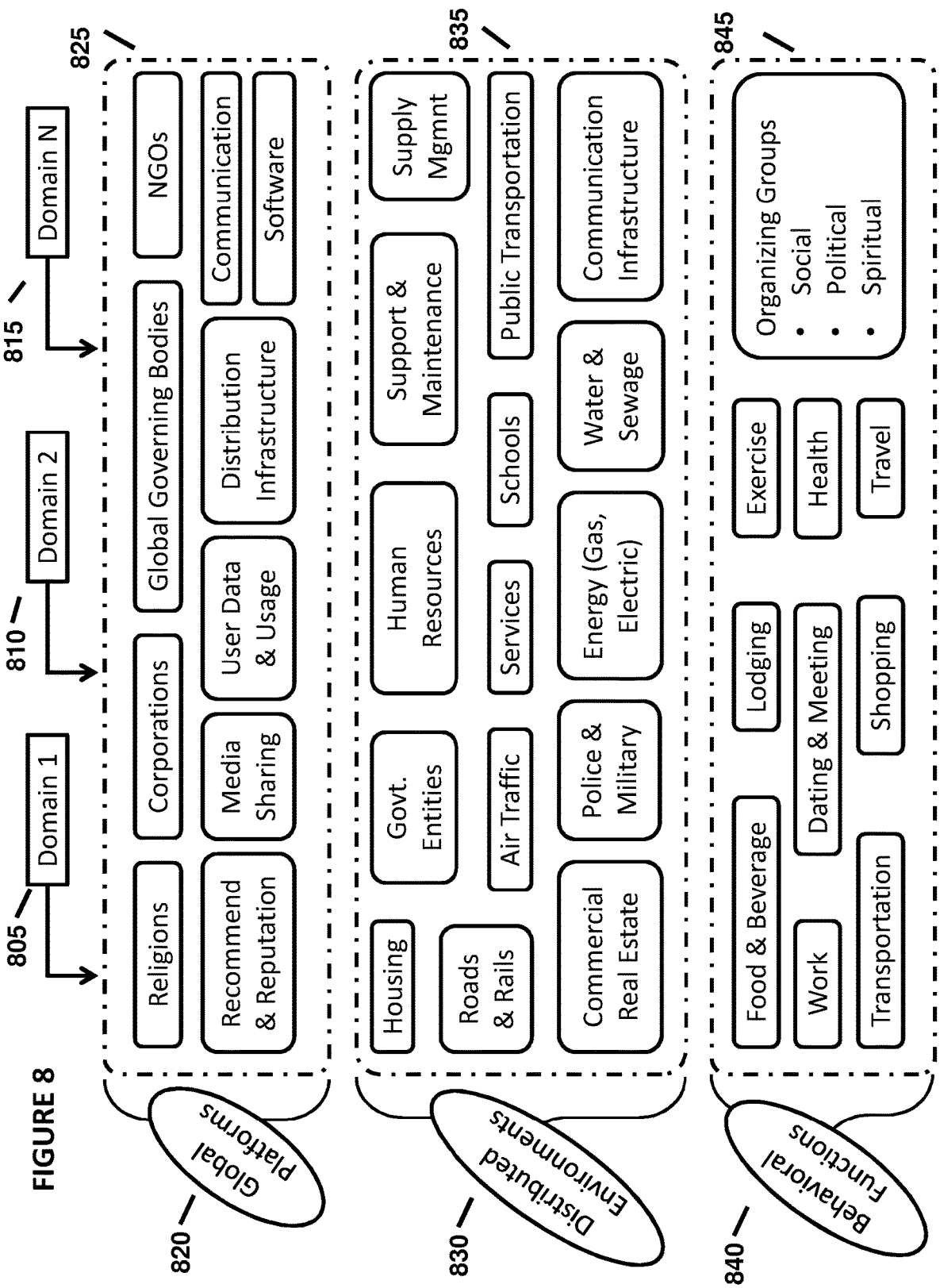
FIG. 8 illustrates a further view of social and governance relationships.

FIG. 8 illustrates a further view of social and governance relationships. Domains are represented as elements 805-815. FIG. 8, however, separates out global platforms 820-825 including Religions, Corporations, Global Governing Bodies (such as the United Nations, the World Trade Organization, and the World Bank), NGOs and various functional tools: Recommendation & Reputation, Media Sharing, User Data & Usage, Distribution Infrastructure, Communications, and Software.

Distributed environments 830-835 include Housing, Roads and Rails, Commercial Real Estate, Government Entities, Human Resources, Support and maintenance, Supply Chain Management, Air Traffic Control, Services, Schools, Public Transportation, Police and Military, Gas and Electricity, Water and Sewage, and the Communications Infrastructure. Finally, Behavioral Functions (840-845) are represented by Food and Beverage, Lodging, Exercise, Work, Dating and Meeting People, Health, Transportation, Shopping, Travel and all manner of Social, Political and Spiritual Organizing Groups.

In order to analyze and manage complex relationships, there is the need for multiple training sets across many axes with any number of facets. Because of the sheer number of potential sets, a limited set of exemplary sets will be discussed below with exemplary considerations. This disclosure should allow one of skill in the art to extrapolate as necessary.

Training first requires a division into groupings and sub-groupings using a taxonomy like that described above: Behavior, Infrastructure and Governance. As discussed previously, behavior is inclusive of Food & Beverage Consumption, Dwelling, Transportation, Working, Shopping, Dating & Meeting, Traveling, Social Groupings, Political Groupings and Affiliations, Spiritual Groupings, Electronic Sharing (Instagram, Facebook, Texting, Email). Infrastructure is inclusive of Housing, Commercial Real Estate, Roads and Rails, Air Traffic Control, Public Transportation, Energy (Gas & Electric), Water and Sewage, Communications Infrastructure (wireless, wired, etc.), Supply Chain Management, Police and Military and the Support and Maintenance. Governance in turn includes Government Entities, NGOs, Corporations, Religions.

The collection of training sets from the foregoing will look similar in some contexts but will nevertheless encompass subtle differences. For example, when we look at Transportation in Behavior, we are interested in how and when and by what means people travel. But Infrastructure also encompasses Transportation but concerns how it is built, what areas it connects what technologies it uses, how is it budgeted, and how is it maintained.

Food and Beverage Consumption considers what foods people eat, when and how often do they eat out in restaurant,s and what types of restaurants (sit-down, to go, Mexican, Italian, Chinese). Other elements include how far one travels to eat, length of meals, how often one eats in the home of another, and with how many. Other data may include when and how often do people eat at home, and what foods are eaten at home as opposed to at other's homes as opposed to in restaurants. Data must be grouped granularly; for example, in the Greek immigrant communities in Queens, N.Y. or by Hassidic Jews in Hancock Park or Los Angeles.

Queries as to dwelling may consider density (people per square kilometer), size, construction materials, services (gas, heat, plumbing), large or small kitchens, kitchens in center of home or sequestered, frequency of moving, number of persons living in a home, taxes, HOAs and the like.

Contextually similar inquiries may be made across the likes of transportation, work, shopping, relationships, social interactions, travel, social groupings, and electronic engagement. In the latter instance, data analysis could consider how social media or engagement platforms are used by various social grouping. That is, it is not just how many Facebook users in Bosnia attend Catholic mass regularly but also how many regular mass attendees in Bosnia use Facebook and when and for what? How is the addictive nature of social networking impacting different social domains? What kinds of communication do different social groups use and for what purposes? What times of the day? What are the correlations between social networking and social life?

In the context of infrastructure, one might look at housing (value, own, or rent), commercial real estate (ownership, lease length, proximity to services), roads and rails (price, classes, payment method), air traffic control (public or private, funding, oversight), public transportation (hours and days of operation, diversity of riders), energy (gas or electric), water and sewage (safety, public or private utility), communications (wired or wireless), payment mechanisms (credit, debit, cash), supply chain management (plane, boat, truck), police and military (funding, governance, accountability, community engagement), and support and maintenance (social safety nets).

Governance might look at federal, state, international, county, local organizations and voting. NGO consideration may look at breadth of reach and public perception while corporations made look at diversity, profit, reach, transparency, and control. Religion in turn may consider entrenchment in culture, influence on power, and accountability to the masses they serve.

Figure 9:
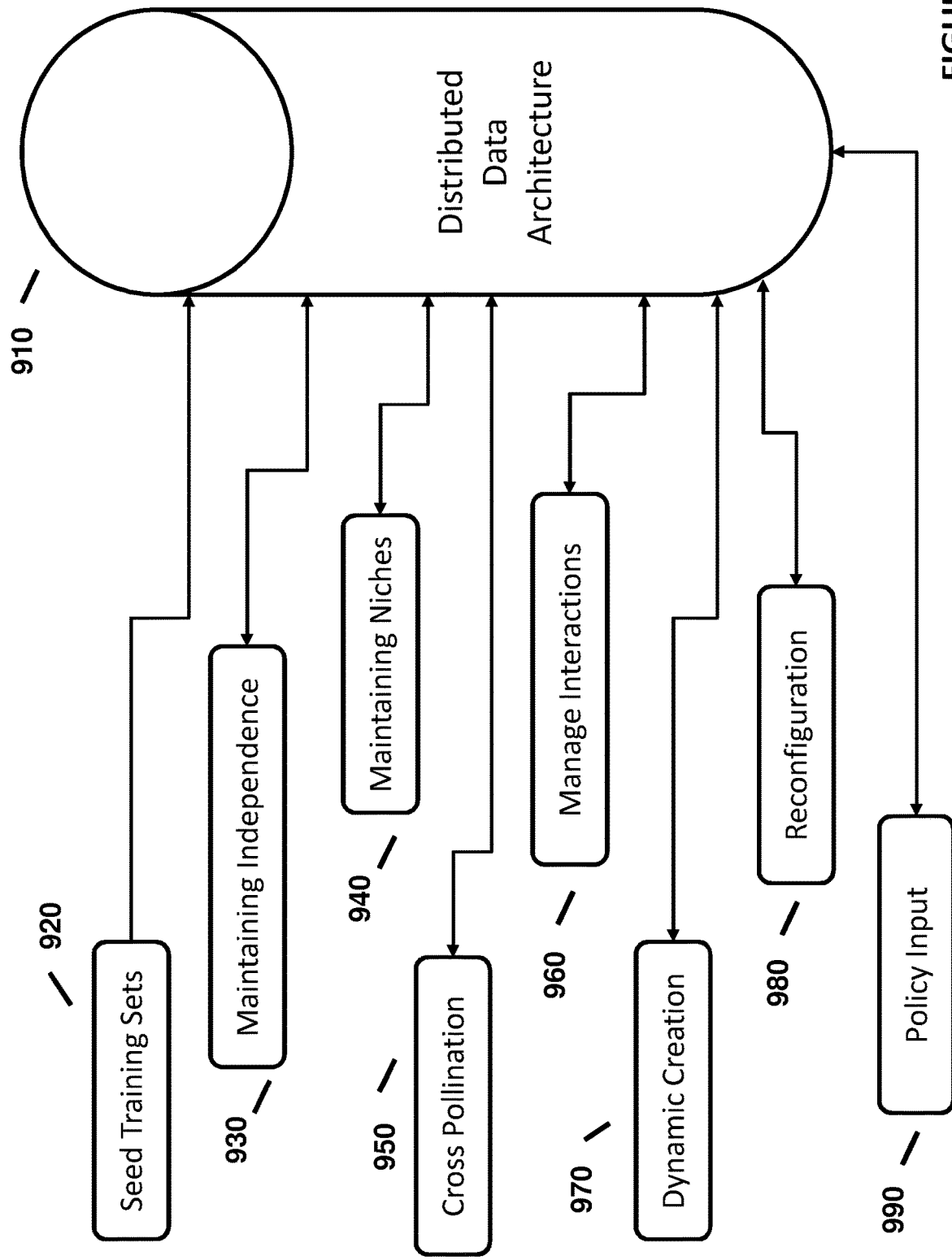
FIG. 9 illustrates the creation, reconfiguration, and monitoring of training sets.

FIG. 9 illustrates the creation, reconfiguration, and monitoring of training sets. It is here that once training sets have been created that they may be implemented in the context of enhancing social diversity.

A store of all data sets is maintained in Distributed Data Architecture (910). The AI system will then start with Seed Training Sets (920). Social scientists utilizing the present invention should be able to pick from hundreds of available data sets as starting points. For example, in some territories, tremendous amounts of available data are held by the government such as in China or Russia. In more cosmopolitan states like the Nordic countries, data is available if there are sufficient permissions and protections in place.

As the AI system gathers data there are many interactions that must be managed and maintained. First, the independence of the different data sets must be maintained 930. Though many of the data for social and physical groupings will be common, they must be identified separately. The AI system and users of the same must always be able to go back to the original data for reanalysis, forensic analysis, tracking over time, and/or correlation to other data. Data will often have a correlation and even causation to other disparate data but the threads must always be capable of disentanglement.

The system must also know the relationships between and among them for the purpose of maintaining niches 940. Just as extinction of species is generally bad for the Earth's biological resilience, maintaining niche social groupings is a critical component to social diversity. By monitoring social niches 940, one can track their health and be careful not to taint them with inadvertent cross pollination.

The foregoing notwithstanding, there may be instances where intentional cross-pollination 950 is desirable. For example, one might observe patterns that impact the health of some social groupings and by seeing which behaviors have inoculated similar social groupings. The AI system could be used to implement a cross-pollination to effectuate and inoculate social groupings that might otherwise be at risk.

Social groupings interact with one another will need to be monitor and even managed amongst training sets (960). Because the world is continuously changing, training sets will likewise need to be subject to change (970). This is especially true and new groupings and relationships evolve.

There will also be the need to reconfigure training sets (980) so that they continue to match appropriate goals. This may occur by pruning unnecessary factors and adding new ones as they evolve. Finally, there is a need for policy input (990) whereby implementation and execution can be governed by the appropriate members and factions of global society.

Neural nets like Convolutional Neural Networks (CNNs) (often used for object recognition) and Recurrent Neural Networks (RNNs) (often used for language comprehension) can be applied to the problem of social network classification. A CNN would be used to classify the data from observations about behavioral data while an RNN would likely be used to track the social components over time and then predict the future behaviors based on that data.

A corpus of training targets that are socially agnostic behaviors like walk or drive or take the bus may be used but the ultimate goal is for the system to create its own targets based on observed behavior. Labels can be arbitrary or descriptive For example, Hassidic Jews walking to temple on Saturday might be labeled as fgoh3etfjhbc7 and Berber families sharing mint tea with neighbors might be iuGLfgnKJrB787m65. The AI system does not have to know the meaning of any of these behaviors—only their labels and behavioral scores. In order to improve accessibility, it would be useful for the behaviors to have human readable labels that can be generated by the system by concatenating the names of some of the behaviors and/or humans can look at behavioral groupings and ascribe names. The output of the CNN is the similarity to other social groupings which we refer to as Commonality.

Figure 10:
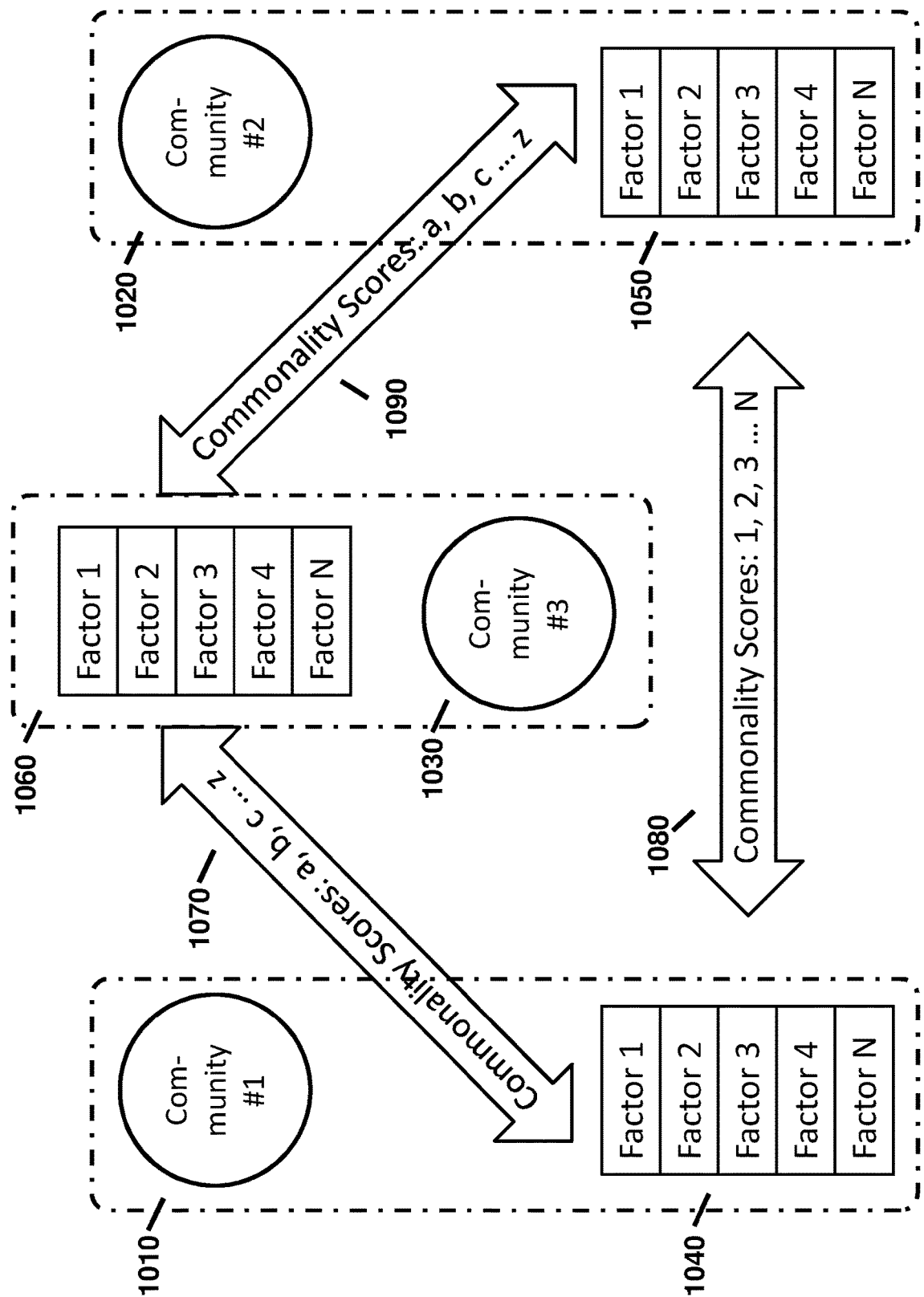
FIG. 10 illustrates a comparison of factors and communities to identify commonalities.

FIG. 10 illustrates a comparison of factors and communities to identify commonalities. Through practice of FIG. 10, we can not only apply solutions developed in one community to problems in a socially similar but geographically distant community but we can also monitor when communities are having their diversity eroded. FIG. 10 of the AI system allows identification of how common communities have maintained their diversity (for example, having the trains not run in some areas on certain days might encourage more foot traffic and a stronger sense of local community).

The AI system of the presently disclosed invention does this by approaching each factor and giving it a rating or Factor Weight based on its proximity to like communities. For example, if a community regularly uses public transportation to go to work within the physical boundaries of that community, it has, potentially, more in common with other communities that use public transport in that way. In order to weigh the closeness of these two communities on that particular axis, the system will generate a commonality score where a score of 1 is identical and a 0 is no commonality at all.

For example, if most people of a given profile (including income range, proximity to work, hours of work) in Paris take the Metro to/from work an average of 7 times a week and people of similar profiles in New York City take the subway to work an average of 6.5 times a week, their commonality score would be (for that social sector on the axis of public city rail transport) 0.93 (6.5/7). For cases like New York and Paris, the training set would already be sufficiently large. But consider a smaller community—devout Catholics in Tehran's Jewish District—the system would look at all individual behaviors. For example, 95% are Catholic, 98% of the Catholics walk to church, they eat at home 95% of the time, at friend's homes 4% of the time and in restaurants 1% of the time, they wear cotton and not silk and wear dull colors almost exclusively. The system would then look for other social groupings with a Commonality Score above 0.95 on those particular axes.

To see this diagrammatically we turn to the aforementioned FIG. 10. FIG. 10 illustrates 3 communities (1010, 1020, 1030) and three sets of N factors (1040, 1050, 1060). From this, the AI system derives 3 sets of N Commonality Scores (1070, 1080, 1090). By choosing the factors and communities that are compared, one can see which communities have commonalities on which factors. The system may also wish to consider global commonality and global diversity. In this context, the system might consider the 150 factors with the most global commonality based on both population and on number of communities.

Returning to FIG. 9, Dynamic Creation (970), Reconfiguration and Monitoring of Training Sets (980) are all tied to a common Distributed Data Architecture (910). Training Sets will continuously be changing. People will migrate in and out of communities, business will come and go, and population makeups will change. Every individual Training Set represents a moment in time and, over time, these moments make up trend lines. With these trend lines we can map commonality scores over time and see how communities are converging or diverging. This is particularly valuable as the AI system seeks to avoid convergence that is counter to social diversity and can lead to fragility of the social structures of the planet.

There will additionally and continuously be new factors that are becoming important and others that are fading away. For example, self-driving cars begin to replace human driven ones. The AI system of the present invention may analyze behavior to find new factors that previously did not exist. Whenever factors move in ways that were not predicted or in trend, the system should look for the existence of new factors. These factors can be surmised by looking at local news, social media, or individual engagement. For example, people may begin living in community buildings with shared kitchens and pre-schools. The AI system may continuously monitor social networks like Facebook or Nextdoor.com to identify social trends that can then be extrapolated into factors. These factors can then be applied to the training sets and any resultant commonalities. Just as new factors will join the analysis, old factors will wither and be pruned or made sufficiently unimportant as to be ignored or removed by the AI systems.

The system should also track outliers with a view toward nurturing them and toward using their unique social approaches for possible value to other communities. The system may likewise track for aberrant or destructive behavior. This may aid in keeping training sets independent (930) so that they are not tainted by the whole.

Training Sets will interact naturally with real life. For example, people will commute from one community to another, people will move, children will go off to college. One factor of migration is the tendency toward homogenization. When there are numerous interactions (960) between closely situated communities there will naturally be Cross-Pollination (950) of social behaviors as well as common usage of infrastructure and services. These interactions and cross-community influences can also be tracked as another form of Meta Commonalities.

Figure 11:
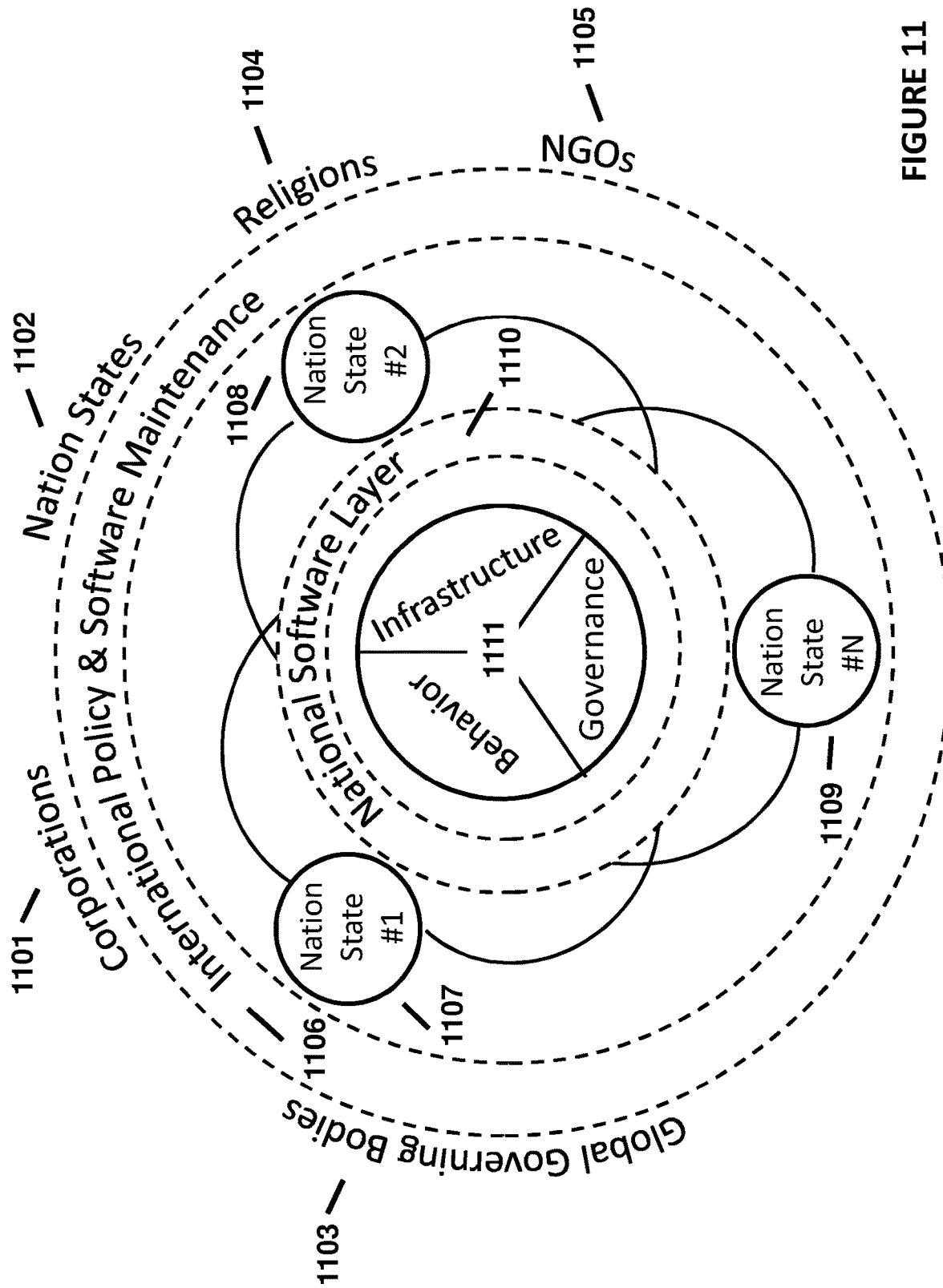
FIG. 11 illustrates the interaction between territories, data, architectures, and data structures.

FIG. 11 illustrates the interaction between territories, data, architectures, and data structures. FIG. 11 addresses the underlying question of 'what do we do with all of the data and how do we enhance social diversity without abusing its power?' First the machine decision-making must be forensically trackable.

Actions taken must have the provenance of laws. Territoriality must be respected. The use of tools like the presently disclosed AI system must be made available to those governments that wish to use them but access must be controlled by an international body such as the United Nations or ICANN. Data must be capable of being limited to individual territories and territories may want to manage their own data but the architectures and data structures must be interoperable.

FIG. 11 roughly illustrates how these components fit together. At the highest level there are extraterritorial entities like Corporations (1101), Participating Nation States (1102), Global Governing Bodies (1103) such as the United Nations and the World Trade Organization, and World Court, Religions (1104), and Non-Governmental Organizations. Together these groups will manage the Policies (1106) associated with Software Maintenance and Availability, AI approaches, Privacy, Security and Forensic Archiving and Tracking.

Each Nation State Member (1107, 1108, 1109) will have input into the policy decisions. For example, voting weighted based on a combination of GDP and population. They will also have access to the software and tools developed (1106). They will be allowed to use this software and at least some of the tools in their own National Software Layer (1110). All of this gets its data from the Behavior, Infrastructure and Governance (1111) of the Social Groupings.

The foregoing description has been directed to exemplary embodiments. Other variations and modifications may be made to the described embodiments in light of the disclosure as presented above. For instance, it is expressly contemplated that the components and/or elements described herein can be implemented as software being stored on a tangible (non-transitory) computer-readable medium, devices, and memories such as disks, CDs, RAM, and EEPROM having program instructions executing on a computer, hardware, firmware, or a combination thereof.

Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code.

Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on.

Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures.

Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system for enhancing diversity through machine learning, the system comprising:
   storage that maintains information concerning behaviors, infrastructure, and governance; and
   a software engine maintained in a non-transitory storage medium and executable by a processing device to:
   gather training sets;
   analyze the information concerning behaviors, infrastructure, and governance in light of the training sets, wherein analyzing the information includes engaging in unsupervised learning based on weighted variables associated with the training sets to identify correlations between sets of the information; and
   output policy suggestions that deviate from a single best solution in favor of multiple diverse solutions.

2. The system of claim 1, further comprising an output device that receives the output and translates machine-readable information in the output into one or more visual data representations.

3. The system of claim 1, wherein the storage further maintains the training sets and independence of the training sets over time.

4. The system of claim 3, wherein the storage further maintains a plurality of seed training sets, wherein the gathered training sets are based on the seed training sets.

5. The system of claim 1, wherein the software engine is further executable to dynamically create the training sets as the information maintained in the storage is changed.

6. The system of claim 1, wherein the software engine is further executable to dynamically reconfigure the training sets as part of training an artificial intelligence (AI) model.

7. The system of claim 1, wherein the software engine dynamically reconfigures the training sets based on one or more changed or new factors.

8. The system of claim 1, wherein the software engine is further executable to cross-pollinate one or more of the training sets, wherein one or more external inputs are selected for training an AI model.

9. The system of claim 1, wherein the software engine is further executable to maintain one or more niche data sets for training an AI model.

10. The system of claim 1, wherein the software engine further analyzes the information by identifying or more relationships between data of the training sets.

11. The system of claim 1 wherein the software engine is further executable to create a target based on the analyzed information.

12. The system of claim 1, wherein the software engine is further executable to create a label based on the analyzed information.

13. The system of claim 12, wherein the software engine creates the label based on one or more behavioral scores associated with the analyzed information.

14. The system of claim 1, wherein the software engine is further executable to identify one or more trend lines.

15. The system of claim 14, wherein the software engine is further executable to map the trend lines and commonality scores over time to identify data convergence or divergence.

16. The system of claim 1, wherein the software engine is further executable to:
monitor one or more online networks for one or more trends;
extrapolate the trends into one or more factors, and
apply the factors to the training sets to identify one or more new commonalities.

17. A method for enhancing diversity through machine learning, the method comprising:
maintaining information in storage concerning behaviors, infrastructure, and governance; and
executing a software engine maintained in a non-transitory storage medium, wherein the software engine is executed by a processing device to:
gather training sets;
analyze the information concerning behaviors, infrastructure, and governance in light of the training sets, wherein analyzing the information includes engaging in unsupervised learning based on weighted variables associated with the training sets to identify correlations between sets of the information; and
output policy suggestions that deviate from a single best solution in favor of multiple diverse solutions.

18. A non-transitory, computer-readable storage medium, having embodied thereon a program executable by a processor to perform a method for enhancing diversity through machine learning, the method comprising:
maintaining information in storage concerning behaviors, infrastructure, and governance; and
executing a software engine maintained in a non-transitory storage medium, wherein the software engine is executed by a processing device to:
gather training sets;
analyze the information concerning behaviors, infrastructure, and governance in light of the training sets, wherein analyzing the information includes engaging in unsupervised learning based on weighted variables associated with the training sets to identify correlations between sets of the information; and
output policy suggestions that deviate from a single best solution in favor of multiple diverse solutions.

* * * * *